(12) United States Patent
Buhrman

(10) Patent No.: US 7,055,841 B2
(45) Date of Patent: Jun. 6, 2006

(54) TRICYCLE AND STEERING ASSEMBLY

(75) Inventor: Gary R. Buhrman, Town & Country, MO (US)

(73) Assignee: Angeles Group, LLC, Pacific, MO (US)

( * ) Notice: Subject to any disclaimer, the term of this patent is extended or adjusted under 35 U.S.C. 154(b) by 0 days.

(21) Appl. No.: 10/861,713

(22) Filed: Jun. 4, 2004

(65) Prior Publication Data

US 2004/0245742 A1    Dec. 9, 2004

Related U.S. Application Data

(60) Provisional application No. 60/476,021, filed on Jun. 5, 2003.

(51) Int. Cl.
*B62K 1/00* (2006.01)
*B62H 1/00* (2006.01)

(52) U.S. Cl. ............... 280/263; 280/47.11; 280/62; 446/440

(58) Field of Classification Search ............ 280/263, 280/771, 47.11, 62, 1.202; D12/85, 175; 446/440; 74/552
See application file for complete search history.

(56) References Cited

U.S. PATENT DOCUMENTS

| | | | | |
|---|---|---|---|---|
| D169,424 S | * | 4/1953 | Daehler | D78/1 |
| D169,425 S | * | 4/1953 | Daehler | D78/1 |
| D208,790 S | * | 10/1967 | Reeves | D34/15 |
| 3,533,305 A | * | 10/1970 | Hill | 74/551.3 |
| 3,605,929 A | * | 9/1971 | Rolland | 180/208 |
| 4,079,957 A | * | 3/1978 | Blease | 280/278 |
| D249,499 S | * | 9/1978 | LeRose | D12/175 |
| 4,276,787 A | * | 7/1981 | Kellner | 74/552 |
| 4,457,529 A | * | 7/1984 | Shamie et al. | 280/278 |
| 4,580,802 A | * | 4/1986 | Herman et al. | 280/267 |
| 4,785,495 A | * | 11/1988 | Dellis | 16/421 |
| 5,924,713 A | * | 7/1999 | Li | 280/270 |

OTHER PUBLICATIONS

"2004 Product Catalog", pp. 4-8 and 13-15, Angeles Group, LLC, Pacific, Missouri.

* cited by examiner

Primary Examiner—Tony Winner
(74) Attorney, Agent, or Firm—Woodard, Emhardt, Moriarty, McNett & Henry LLP

(57) ABSTRACT

In one embodiment of the present invention, a steering mechanism for a children's toy vehicle comprises a non-circular wheel piece connectable to a wheel turning mechanism of a toy vehicle. An arcuate front portion extends along the front periphery of the wheel piece. Preferably, the steering mechanism further comprises a curved rear portion along the rear periphery of the wheel piece. In one preferred embodiment of the present invention, the steering mechanism includes a rear portion which is nested between two end portions of the front portion and the front portion and the rear portion form a tulip shape. In a further preferred embodiment of the present invention, the steering mechanism and wheel piece is combined with a front wheel frame which is connected to the wheel piece, a front tricycle wheel mounted to the front wheel frame, and a rear wheel frame which is pivotably coupled the front wheel frame. Two rear tricycle wheels are mounted to the rear wheel frame. The wheel piece of the steering mechanism is connected to the front wheel frame at a point eccentric to the wheel piece, and optionally is connected to the front wheel frame at a point offset forward from the center of the wheel piece.

18 Claims, 6 Drawing Sheets

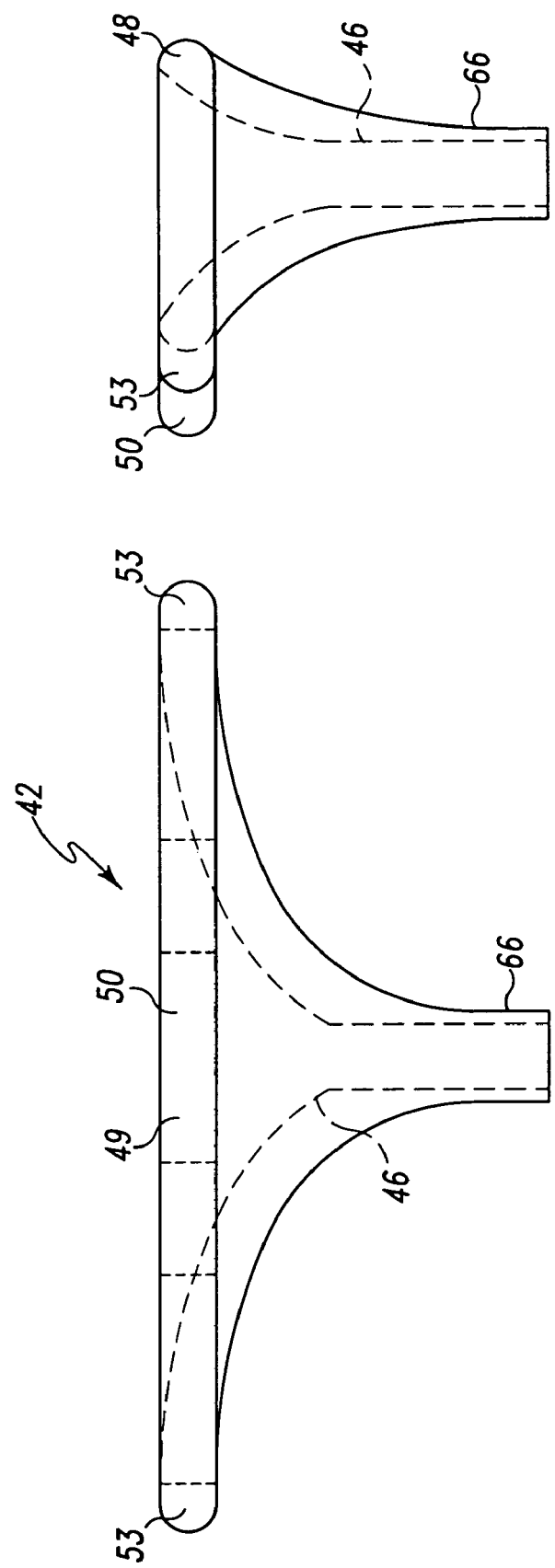

TRICYCLE AND STEERING ASSEMBLY

This application claims priority to provisional application Ser. No. 60/476,021 filed on Jun. 5, 2003, which is incorporated herein by reference.

FIELD OF THE INVENTION

The present invention relates to tricycles and in particular an improved steering mechanism for a tricycle.

BACKGROUND OF THE INVENTION

A popular and traditional children's riding vehicle is a tricycle. A standard tricycle includes three wheels, a frame with a seat, and handlebars allowing a child to steer the tricycle. In the traditional arrangement, two handlebars typically extend from a middle-mounting portion to two end members sometimes covered with handgrips. The end portions of these handlebars typically are made of metal and raise a risk of the handlebar end potentially harming the child either when there is an accident on the tricycle or, for example, if a child merely runs into the side of the tricycle. In many cases, tricycles have the center point of the handle bar positioned so that the driver can potentially be pushed or thrown into the handlebars and/or pivot bolt, potentially causing injury. Additionally, to facilitate sizing and steering of the tricycle, these handlebars typically extend a particular distance away from the middle of the tricycle, which can lead to discomfort for a child who may have to extend and raise and/or lower their arms. There is a need for an improved tricycle. Certain embodiments of the present invention address these and other needs.

SUMMARY OF THE INVENTION

In one embodiment of the present invention, a steering mechanism for a children's toy vehicle comprises a non-circular wheel piece connectable to a wheel turning mechanism of a toy vehicle. An arcuate front portion extends along the front periphery of the wheel piece. Preferably, the steering mechanism further comprises a curved rear portion along the rear periphery of the wheel piece. In one preferred embodiment of the present invention, the steering mechanism includes a rear portion which is nested between two end portions of the front portion and the front portion and the rear portion form a tulip shape.

In one alternate preferred embodiment of the present invention, the wheel piece defines one or more grips along the periphery of the front and rear portions of the steering mechanism and the wheel piece includes one or more openings defined through the wheel piece adjacent the grips. In another preferred embodiment of the present invention, the steering mechanism contains grips which are contoured and are formed with a resilient material.

In a further preferred embodiment of the present invention, the wheel piece of the steering mechanism is primarily made of blow-molded or injection molded plastic. Optionally, the wheel piece of the steering mechanism incorporates one or more portions covered with a resilient cushioning material.

In a still further preferred embodiment of the present invention, a steering mechanism with a wheel piece is combined with a front wheel frame, a front tricycle wheel mounted to the front wheel frame, and a rear wheel frame which is pivotably coupled the front wheel frame. The two rear tricycle wheels are mounted to the rear wheel frame. The wheel piece of the steering mechanism is connected to the front wheel frame at a point eccentric to the wheel piece, and optionally is also connected to the front wheel frame at a point offset forward from the center of the wheel piece.

In an alternate preferred embodiment of the present invention, the front wheel frame is coupled with the rear wheel frame along a pivot axis and the front wheel frame is connected to the wheel piece along a mounting axis. The mounting axis is parallel to and offset forward from the pivot axis. Optionally, a seat is mounted to the rear frame portion and a pedal crank is coupled to the front wheel to propel the front wheel. In one embodiment, the front wheel frame and the front wheel define a turning axis. In certain embodiments, the front wheel frame is coupled to the rear wheel frame such that the turning axis is parallel to and offset forward from the pivot axis.

In a different embodiment, the tricycle comprises a front frame which has a front tricycle wheel mounted to a front frame along a turning axis, and a rear frame pivotably coupled to the front frame along a pivot axis such that the turning axis is parallel to and offset forward from the pivot axis such that the mounting axis is offset from one or both of the pivot axis and the turning axis. The tricycle also includes two tricycle wheels which are mounted to the rear frame and a steering mechanism that is associated with the front frame along a mounting axis.

It is an object of certain embodiments of the present invention to provide an improved tricycle.

Further objects, features and advantages of the present invention shall become apparent from the detailed drawings and descriptions provided herein.

DESCRIPTION OF THE DRAWINGS

FIG. 4 is a rear view of the steering mechanism of FIG. 1.

FIG. 5 is side view of the steering mechanism of FIG. 1.

BRIEF DESCRIPTION OF PREFERRED EMBODIMENTS

Figure 1:
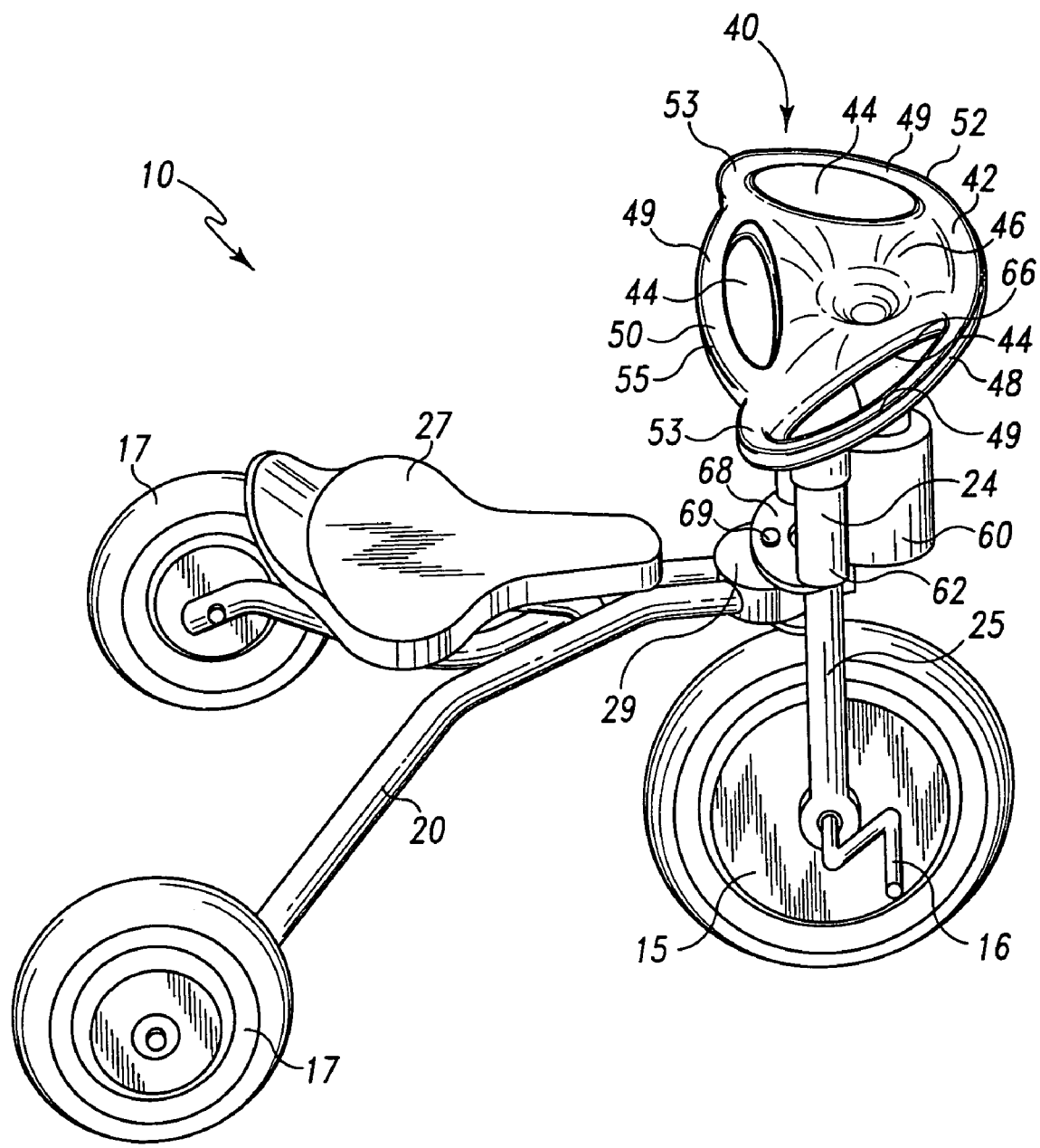
FIG. 1 is a perspective view of one preferred embodiment of the present invention.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Illustrated in the accompanying figures is an improved tricycle with a steering assembly and steering mechanism, for use typically by children. In certain embodiments, the tricycle provides a steering mechanism which is easier, more comfortable and/or safer for a child to use.

Figure 2:
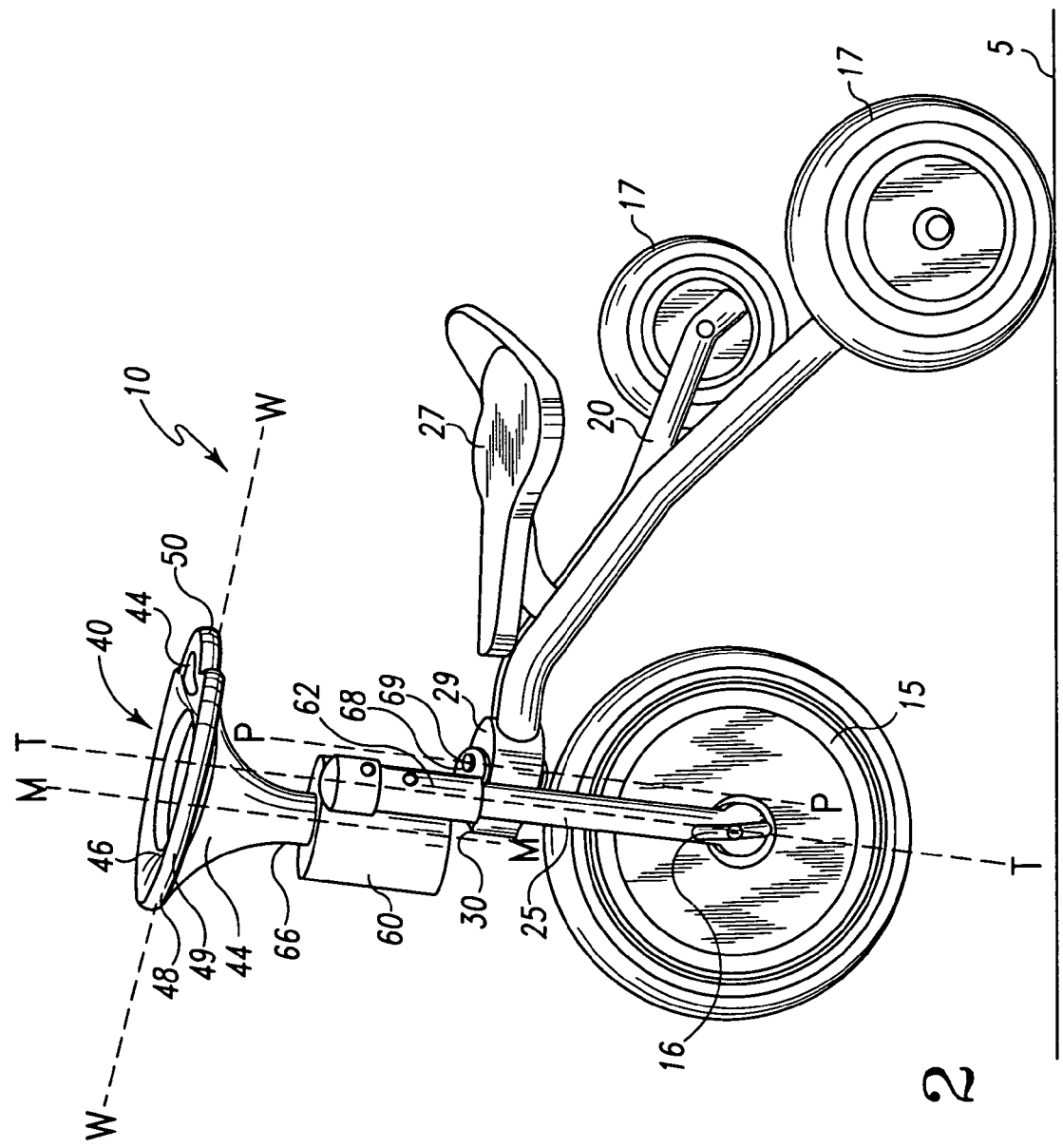
FIG. 2 is a side view of the embodiment of FIG. 1.

Illustrated in a preferred embodiment in FIGS. 1 and 2 is tricycle 10 for use on a support surface 5. Tricycle 10 includes three wheels such as front wheel 15 and rear wheels 17. Rear wheels 17 are connected to rear frame 20 which typically includes a seat 27.

A front frame 24 includes two mounting rods 25 extending from front wheel 15 and is connected via a pivot mechanism 68 to a pivot portion 29 on rear frame 20. A crank 16, optionally with pedals, is attached to or forms the axle of front wheel 15 for the user to propel the front wheel and thus the tricycle. Alternately a non-pedal or "push" style tricycle can be used.

Tricycle 10 further includes steering wheel assembly 40 and connection piece 60. Steering wheel assembly 40 is connected to connection piece 60 which is operatively coupled via connection portion 68 to rear frame pivot portion 29 at pivot point 69 defining a pivot axis P. Steering wheel assembly 40 operates, when desired, to cause the mounting or connection piece 60 and wheel 15 to turn, guiding tricycle 10 in a desired direction.

Optionally and alternately, the front frame includes two mounting rods connected above the wheel with a bracket to form a fork, with a central post extending upward. The post can serve as or engage connection piece 60. In an alternate embodiment, the post connects directly to the lower portion of the steering mechanism, and a pivot bearing from the rear frame engages the post so that the post defines the pivot axis.

Figure 3:
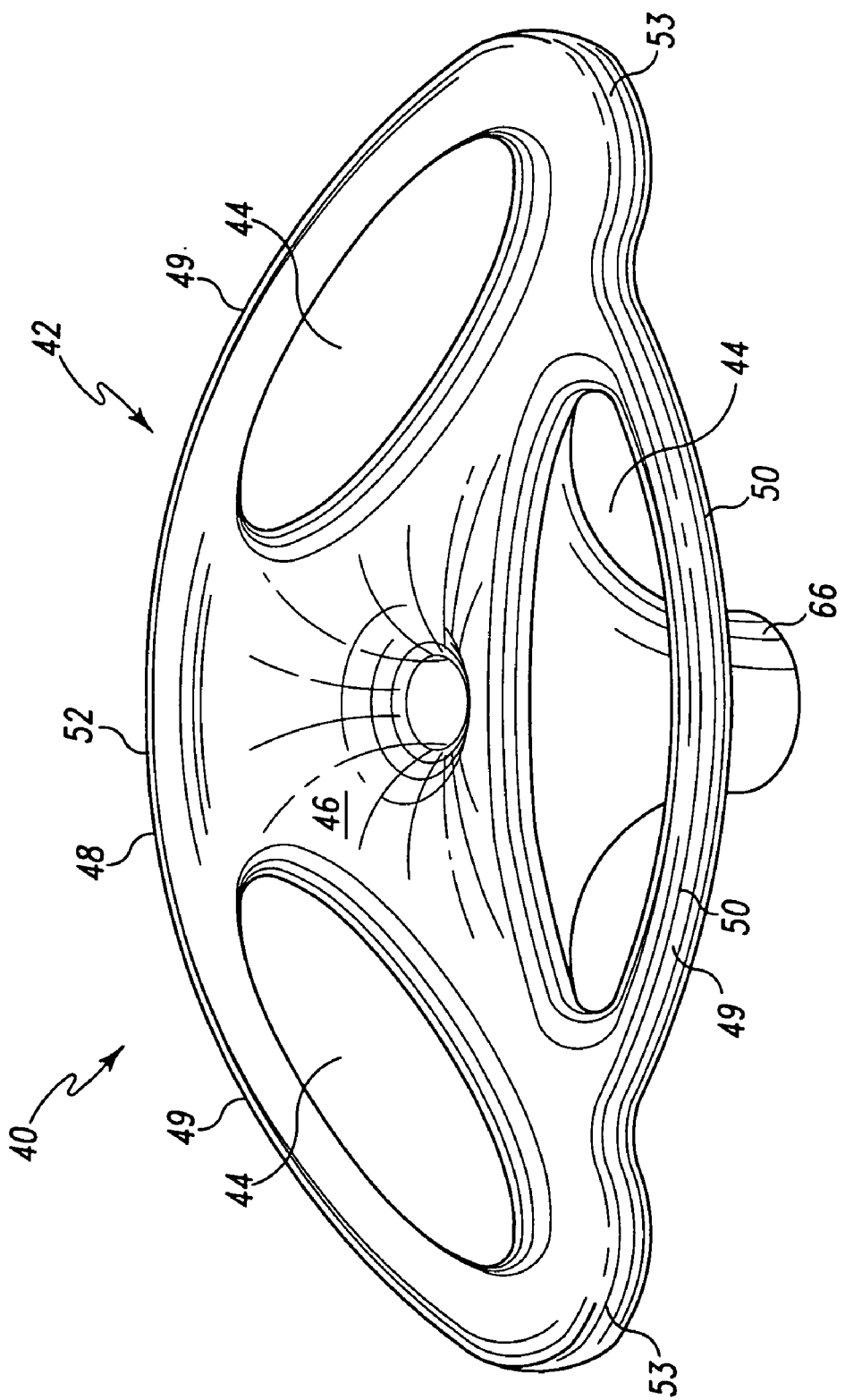
FIG. 3 is a perspective top view of the steering mechanism of FIG. 1.

In the preferred embodiment illustrated, steering wheel assembly 40 includes a wheel piece 42 (shown in detail in FIGS. 3–5). Preferably wheel piece 42 has a non-circular profile. For example, wheel piece 42 includes a central portion 46, a front portion 48 and rear portion 50. Front portion 48 is preferably curved, for example with an arcuate curve 52 defined along the forward periphery of wheel piece 42 which extends between two end portions 53. Rear portion 50 preferably defines a curve 55 along the rear periphery of wheel piece 42. In one embodiment, front portion 48 and rear curved portion 50 each define a radius of curvature, where the two radii are different lengths. In one embodiment, the radius of curvature of rear portion 50 is greater than the radius of curvature of front portion 48. In an alternate embodiment, rear portion 50 is nested between the end portions of front portion 48. In a further embodiment, rear portion 50 and front portion 48 can be characterized as having an upside-down "tulip" shaped top profile, shown in FIG. 3.

Preferably, portions of the outer periphery of wheel piece 42 form grips 49 allowing a child or person on the tricycle to grasp the wheel assembly. Grips 49 may be smooth or contoured, and optionally may incorporate a resilient cushioning material. Optionally, wheel piece 42 defines openings 44 adjacent the grips, which may allow a user's fingers to be received through the openings 44. Openings 44 are shown as ovals as one preferred embodiment. Preferably openings 44 are sized to allow use, but are sized to minimize the risk of a child's hand or fist becoming caught in an opening. In one preferred embodiment, grips 49 are defined generally in the "ten o'clock," "two o'clock" and/or "six o'clock" positions.

Preferably, the central portion 46 of steering wheel assembly 40 is recessed downward. Assembly 40 can be connected to the front frame 24 via a frame connection piece 60 connected to connection portion 66 of wheel assembly 40 or the wheel assembly can connect directly to the front frame 24. Central portion 46 of the steering wheel can have a downwardly recessed connection point and/or can be padded with a resilient cushioning material.

In certain preferred embodiments, wheel assembly 40 and wheel piece 42 are formed in blow-molded or injected molded plastic. Less preferred embodiments can be made from wood, metal, rubber or a hard plastic.

The wheel assembly may be centrally or eccentrically mounted to the front frame and connection piece 60. For example, central portion 46 is shown connected to frame 24 at a point offset forward from the center of wheel assembly 40. Wheel assembly 40 and connection piece 60 may be separate and attached to each other or integrally formed. Connection piece 60 further includes receiving portion 62 to receive the one or two mounting rods 25 or a fork extending upwardly from front wheel 15. Connection piece 60 further includes connection or pivot portion 68. For example, pivot portion 68 can comprise one or two crescent plates forming a bracket above and/or below rear frame pivot portion 29 at pivot point 69, and connected with a bolt having a retaining nut, clip or pin or a similar pivot axle. Pivot point 69 defines a generally vertical pivot axis P (FIG. 2) through which the front frame 24 and front wheel of the tricycle can pivot relative to the rear frame 20 and rear wheels.

In one embodiment, rear frame pivot portion 29 is primarily circular in shape, with a size to fit partially between the front mounting rods 25, and is attached to rear frame 20 along a rear side. Optionally, pivot portion 29 can be formed in upper and lower portions which sandwich and connect to securely hold rear frame 20. In a further option, pivot portion 29 can include a forward flange or bumper 30, optionally with curved sides to limit the pivot distance of the front frame 24 and wheel 15 by providing a stop for the mounting rods 25. In this option, pivot portion 29 could be characterized as a "teardrop" shape.

As a preferred optional feature of certain embodiments, preferably front wheel 15 is mounted to the front frame 24 and together they define a substantially vertical turning axis T, parallel to and offset forward from pivot axis P. This offset mounting of the turning axis T from pivot axis P provides a lever moment between the turning position and the pivot point, allowing the user to more easily turn front wheel 15 relative to the rear frame 20. In an alternate embodiment, the pivot axis P and the turning axis T are aligned.

In a further, separate preferred optional feature of certain embodiments, preferably the steering mechanism such as wheel assembly 40 is connected to the front frame at an offset or eccentric point of wheel assembly 40, defining a substantially vertical mounting axis M. In one option, the wheel assembly 40 is connected to the front frame 24 at a mounting axis M forward of the wheel assembly center. This offset mounting of the steering wheel provides a lever moment between mounting axis M and pivot axis P, allowing the user to more easily turn the steering wheel and front wheel. Mounting axis M may also be offset from turning axis T to provide a further mechanical advantage. In certain embodiments, this further allows the steering wheel assembly 40 and grips 49 to be mounted more closely adjacent to seat 27, allowing a small child's arms to be less extended. In alternate embodiments, the mounting axis M is aligned with one or both of the pivot axis P and the turning axis T.

In a further preferred feature of certain preferred embodiments, steering wheel 40 is preferably mounted at an angle, designated by line W in FIG. 2, generally non-parallel to the support surface 5 for the tricycle 10. The angled mount of steering wheel 40 facilitates and encourages a child or other user to more comfortably and instinctively hold the steering wheel with the user's arm over or beside wheel assembly 40 with their palms on front grips 49 and the user's fingers potentially curling slightly upwardly into openings 44. Rear portion 50 may optionally be used as a rear steering grip with an over-handed grip allowing a user to steer one handed in a balanced, central position.

Figure 6:
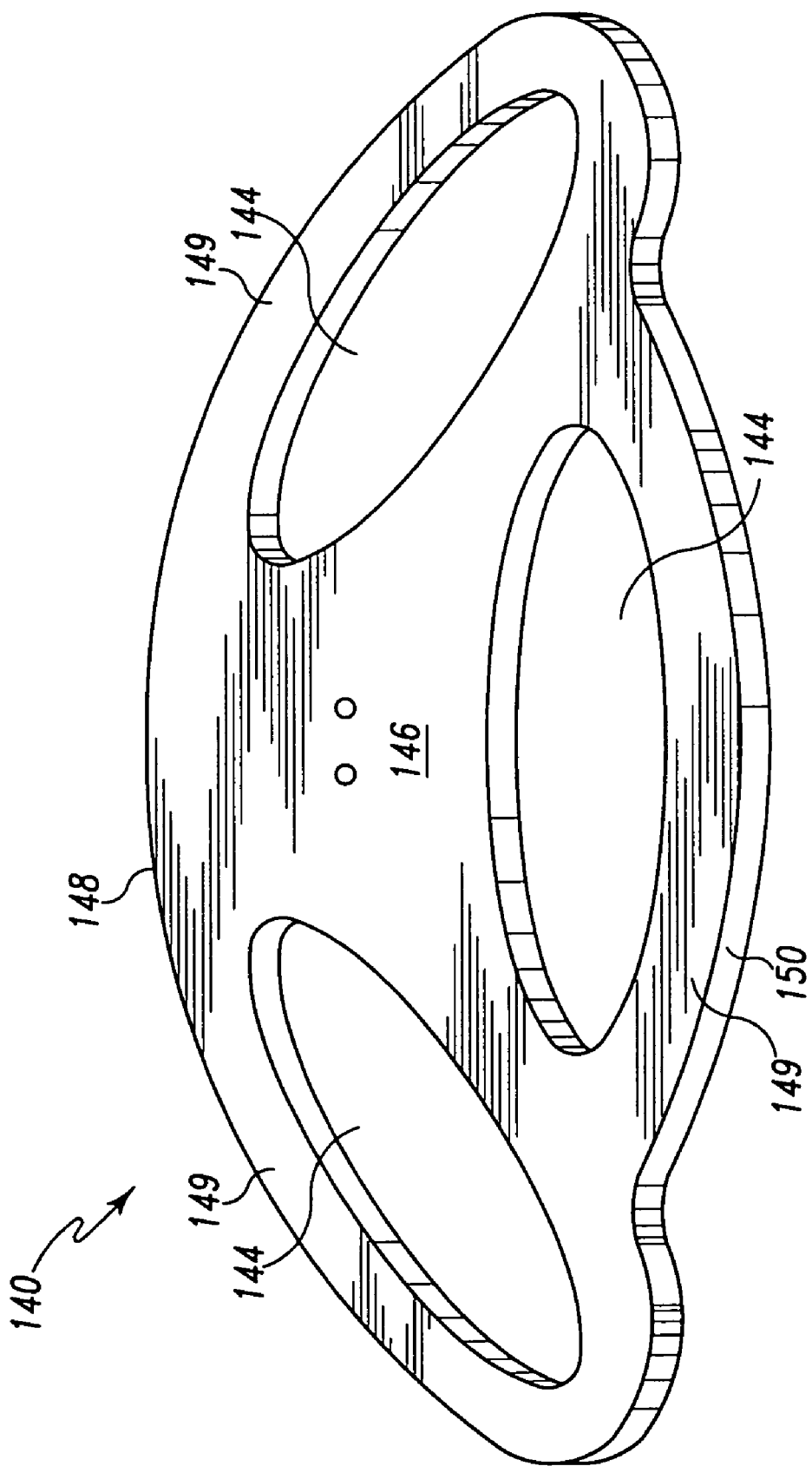
FIG. 6 is a perspective view of a steering wheel according to an alternate preferred embodiment of the present invention.
Figure 7:
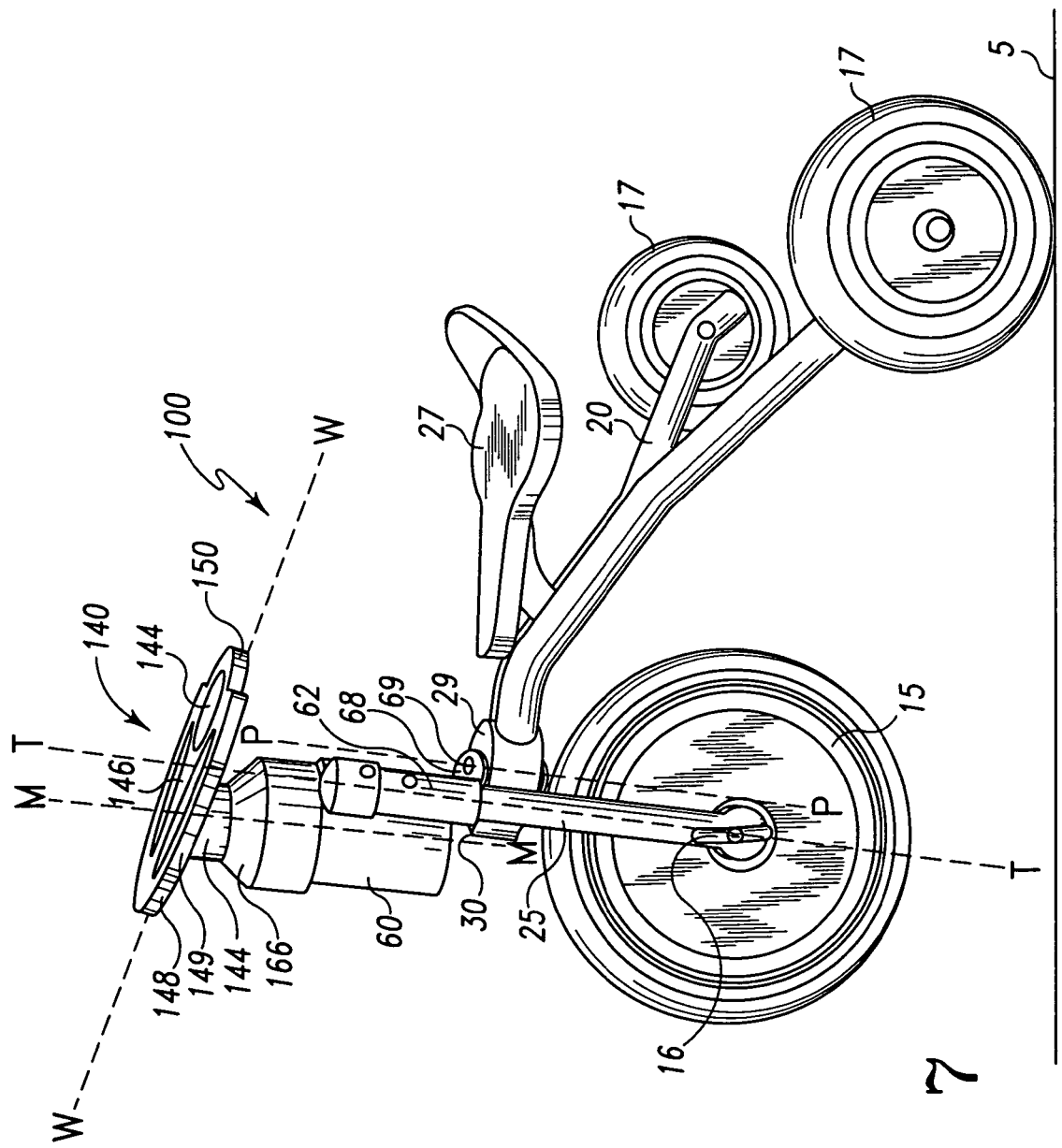
FIG. 7 is a side of an alternate preferred embodiment of the present invention.

An alternate tricycle 100 using alternate steering assembly 140 is illustrated in FIGS. 6–7. Tricycle 100 is substantially similar to tricycle 10, with the change being primarily in steering assembly 140. In this embodiment, steering assembly 140 is substantially flat in central portion 146. The wheel piece includes a front periphery 148, a rear portion 150 and grips 149 with openings 144 substantially adjacent the grips 149. Steering assembly 140 is coupled to tricycle 100 using an upper connection piece 166, and functions substantially similarly to tricycle 10.

The steering mechanism of the present invention further provides advantages in safety and use by incorporating curved corners, radiused edges and a noncircular design which facilitate a child or other user to steer and control the tricycle and increases safety. In some preferred embodiments, the wheel portion is formed of one or a combination of durable, resilient materials such as rubber or injection molded or blow molded plastic. Harder materials such as wood or metal are less preferred alternatives. In alternate features, grips or the central portion of the wheel assembly may include softer, rubberized or resilient portions or parts in smooth or textured configurations to further facilitate gripping of the steering wheel and/or to cushion and minimize any injury based on any impact with the steering wheel.

In still further embodiments, the present invention is illustrated with a tricycle, but the steering wheel assembly may be used with other toy vehicles. Examples of such vehicles include bicycles, four-wheel vehicles such as toy cars or steerable vehicles such as toy boats.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tricycle, comprising:
   a front frame;
   a front tricycle wheel mounted to said front frame along a turning axis;
   a rear frame pivotably coupled to said front frame along a pivot axis;
   two tricycle wheels mounted to said rear frame;
   a non-circular steering wheel associated with said front frame along a mounting axis wherein said steering wheel is connected to said front wheel frame at a point offset forward from the center of said steering wheel; and,
   wherein said turning axis is parallel to and offset forward from said pivot axis;
   wherein said steering wheel defines an arcuate front portion substantially along the length of the front periphery of said wheel piece;
   wherein said steering wheel includes a curved rear portion;
   wherein said arcuate front portion defines two end portions, and wherein said curved rear portion is nested between said end portions.

2. The tricycle of claim 1, wherein said steering wheel has a downwardly recessed central portion.

3. A steering mechanism for a children's toy vehicle, comprising:
   a. a non-circular wheel piece connectable to a wheel turning mechanism of a toy vehicle;
   b. an arcuate front potion defining an arc extending substantially across the length of the front periphery of said wheel piece; and,
   c. a curved rear portion along the rear periphery of said wheel piece;
   d. wherein said rear portion is nested between two end portions of said front portion.

4. The steering mechanism of claim 3, wherein said front portion and said rear portion form a tulip shape.

5. The steering mechanism of claim 3, wherein said wheel piece defines one or more grips along the periphery of said front and rear portions.

6. The steering mechanism of claim 5, wherein said wheel piece include one or more openings defined through said wheel piece adjacent said grips.

7. The steering mechanism of claim 6, wherein said grips are contoured.

8. The steering mechanism of claim 6, wherein said grips are formed with a resilient material.

9. The steering mechanism of claim 6, wherein said wheel piece is primarily made of blow-molded or injection molded plastic.

10. The steering mechanism of claim 9, wherein said wheel piece incorporates one or more portions covered with a resilient cushioning material.

11. The steering mechanism of claim 6, wherein said openings are oval shaped.

12. The steering mechanism of claim 3, in combination with a front wheel frame connected to said wheel piece, a front tricycle wheel mounted to said front wheel frame, a rear wheel frame pivotably coupled to said front wheel frame, and two rear tricycle wheels mounted to said rear wheel frame.

13. The combination of claim 12, wherein said wheel piece is connected to said front wheel frame at a point eccentric to said wheel piece.

14. The combination of claim 13, wherein said wheel piece is connected to said font wheel frame at a point offset forward from the center of said wheel piece.

15. The combination of claim 13, wherein said front wheel frame and said front wheel define a turning axis, wherein said front wheel frame is coupled to said rear wheel frame along a pivot axis, and wherein said turning axis is parallel to and offset forward from said pivot axis.

16. The combination of claim 12, wherein said coupling between said front wheel frame and said rear wheel frame is along a pivot axis, wherein said front wheel frame is connected to said steering wheel piece along a mounting axis, and wherein said mounting axis is parallel to and offset forward from said pivot axis.

17. The combination of claim 16, further comprising a seat mounted to said rear frame portion and a pedal crank coupled to said front wheel to propel said front wheel.

18. The steering mechanism of claim 3, wherein said wheel piece has a downwardly recessed central portion.

* * * * *